(12) United States Patent
Tseng et al.

(10) Patent No.: US 11,525,563 B2
(45) Date of Patent: Dec. 13, 2022

(54) LUMINOUS DEVICE AND WEARABLE OBJECT WITH LIGHTING FUNCTION

(71) Applicant: Shen-Ko Tseng, Taipei (TW)

(72) Inventors: Shen-Ko Tseng, Taipei (TW); Yi Tong Yu, Dongguan (CN)

(73) Assignee: Shen-Ko Tseng, Taipei (TW)

( * ) Notice: Subject to any disclaimer, the term of this patent is extended or adjusted under 35 U.S.C. 154(b) by 0 days.

(21) Appl. No.: 16/903,859

(22) Filed: Jun. 17, 2020

(65) Prior Publication Data
US 2021/0041094 A1 Feb. 11, 2021

(30) Foreign Application Priority Data
Aug. 6, 2019 (CN) .......................... 201921253074.0

(51) Int. Cl.
*H05B 47/115* (2020.01)
*H05B 45/10* (2020.01)
*F21V 23/00* (2015.01)
*F21V 23/04* (2006.01)
*F21S 9/02* (2006.01)
*A43B 3/36* (2022.01)
*F21Y 113/10* (2016.01)
*F21Y 115/10* (2016.01)

(52) U.S. Cl.
CPC .............. *F21V 23/009* (2013.01); *A43B 3/36* (2022.01); *F21S 9/02* (2013.01); *F21V 23/001* (2013.01); *F21V 23/0485* (2013.01); *H05B 45/10* (2020.01); *H05B 47/115* (2020.01); *F21Y 2113/10* (2016.08); *F21Y 2115/10* (2016.08)

(58) Field of Classification Search
CPC .. F21V 23/009; F21V 23/0485; F21V 23/001; F21V 33/0008; F21S 9/02; H05B 47/115; H05B 45/10; H05B 45/20; A43B 3/001; F21Y 2113/10; F21Y 2115/10; Y02B 20/40
See application file for complete search history.

(56) References Cited

U.S. PATENT DOCUMENTS 7,928,667 B2 * 4/2011 Peng .................... H05B 45/345
315/294
2004/0207341 A1* 10/2004 Callahan ............... H05B 45/46
315/291

(Continued)

FOREIGN PATENT DOCUMENTS

WO WO-2013088096 A1 * 6/2013 ........... A43B 3/0078

*Primary Examiner* — Renan Luque
(74) *Attorney, Agent, or Firm* — Rosenberg, Klein & Lee (57) ABSTRACT

A luminous device includes a luminous module. The luminous module includes a plurality of LED chips, a driving chip and a package body. The driving chip is configured to selectively drive the LED chips to emit light. The driving chip includes a power pad, a plurality of LED pads corresponding to the plurality of LED chips respectively and a ground pad. The driving chip receives a power signal having a selecting signal and a luminous signal by the power pin, and determines the LED chips to emit light according to the luminous signal or not based on the selecting signal. The luminous device uses the power signal of selecting the LED chip as the driving power for driving the LED chips to emit light in the same time. The luminous device not only reduces the volume, but also saves the cost.

10 Claims, 9 Drawing Sheets

(56) References Cited

U.S. PATENT DOCUMENTS

| | | | |
|---|---|---|---|
| 2005/0018417 A1* | 1/2005 | Chien | B60R 11/00 |
| | | | 362/103 |
| 2007/0263385 A1* | 11/2007 | Fan | G09F 13/22 |
| | | | 362/249.16 |
| 2014/0035481 A1* | 2/2014 | Peting | H05B 47/185 |
| | | | 315/291 |
| 2015/0028773 A1* | 1/2015 | Tseng | H05B 45/30 |
| | | | 315/297 |
| 2015/0029005 A1* | 1/2015 | Kim | A43B 3/001 |
| | | | 340/12.5 |
| 2015/0271881 A1* | 9/2015 | Trinschek | B60Q 3/80 |
| | | | 315/161 |
| 2016/0242490 A1* | 8/2016 | Sander | A43B 3/001 |
| 2016/0334087 A1* | 11/2016 | Lin | H05B 47/155 |

* cited by examiner

| D0~D7 | R0~R7 | G0~G7 | B0~B7 | end |
|---|---|---|---|---|
| selecting signal | luminous signal | | | ending code |

FIG. 6A

| D0~D7 | R0~R7 | G0~G7 | B0~B7 | end | D0~D7 | R0~R7 | G0~G7 | B0~B7 | end |
|---|---|---|---|---|---|---|---|---|---|
| selecting signal | luminous signal | | | ending code | selecting signal | luminous signal | | | ending code |

FIG. 6B

| selecting signal | signal data | | | | | | | |
|---|---|---|---|---|---|---|---|---|
| | D0 | D1 | D2 | D3 | D4 | D5 | D6 | D7 |
| 001 | 1 | 0 | 0 | 0 | 0 | 0 | 0 | 0 |
| 008 | 0 | 0 | 0 | 1 | 0 | 0 | 0 | 0 |
| 021 | 1 | 0 | 0 | 0 | 0 | 1 | 0 | 0 |
| 080 | 0 | 0 | 0 | 0 | 0 | 0 | 0 | 1 |

LUMINOUS DEVICE AND WEARABLE OBJECT WITH LIGHTING FUNCTION

BACKGROUND OF THE INVENTION

1. Field of the Invention

The present invention relates to a luminous device, and more particularly, to a luminous device in which a power line and a signal line are collinear.

2. Description of the Prior Art

With the development of technology, the quality requirements of display images keep increasing. There are more and more luminous elements configured on a single display panel, and the graphics and the manners of flashing of the display panels have become more and more complicated. Therefore, the requirements for the number and the controlling capability of control units to controlling different pixels are also increased, but it will cause very complicated circuits on the display panels. The luminous element of the display panel emits light according to the signal sent by the control unit and the voltage supplied by the power source. However, the more luminous elements the display panel has, the larger load the control unit bears. The control unit would be damaged by greatly rising temperature when the control unit overloads.

In the prior art, the luminous elements of the display panel are controlled by a plurality of control units to decrease the number of signals to be processed by each control unit. However, as the number of control units increases, the signal circuit of the display panel would become more complicated, and the complexity of the power supply circuit would increase.

On the other hand, because of the trend of miniaturization of electronic products, the sizes of the circuit boards and the related components are limited. The complicated circuit on the circuit board will cause the large size of the circuit board and it would not meet the miniaturization trend. Therefore, how to reduce the volume of the circuit board of the display panel and simplify the circuit in the circuit board at the same time are the problems to be solved.

SUMMARY OF THE INVENTION

Therefore, one category of the present invention is to provide a luminous device to solve the problems of the prior art.

In one embodiment of the present invention, the luminous device includes a luminous module, and the luminous module includes a plurality of LED chips, a driving chip and a package body. The driving chip is configured to selectively drive the LED chips to emit light. The driving chip includes a power pin, a plurality of LED pins corresponding to the LED chips, and a ground pin. The package body is configured to seal the driving chip and the LED chips. Wherein, the driving chip receives a power signal by the power pin, and the power signal includes a selecting signal and a luminous signal. The driving chip selectively drives the LED chips based on the selecting signal and the driven LED chips emit light according to the luminous signal.

Wherein, each of the LED chips includes a LED power pin and a LED ground pin, the LED power pins of the LED chips are electrically connected to the corresponding LED pins of the driving chip respectively, and the LED ground pins of the LED chips are electrically connected to the ground pin of the driving chip.

Furthermore, another category of the present invention is to provide a luminous device to solve the problems of the prior art.

In one embodiment of the present invention, the luminous device includes a motion sensor, a controlling device and a plurality of luminous modules. The motion sensor is configured to detect whether an external force is applied on the luminous device and to selectively generate a first controlling signal. The controlling device is configured to send a power signal. The controlling device is electrically connected to the motion sensor and loads a set of predetermined selecting signals and a set of luminous signals corresponding to the set of predetermined selecting signals into the power signal according to the first controlling signal. The plurality of luminous modules are electrically connected to the controlling device, and each of the luminous modules respectively includes a plurality of LED chips, a driving chip and a package body. The driving chip is configured to selectively drive the LED chips to emit light. The driving chip includes a power pin, a plurality of LED pins corresponding to the LED chips, and a ground pin. The package body is configured to seal the driving chip and the LED chips. Each of the driving chips receives the power signal having the set of predetermined selecting signals and the set of luminous signals by the power pin. The driving chips of a first luminous module of the plurality of luminous modules selectively drives the plurality of LED chips in the first luminous module based on a first predetermined selecting signal of the set of predetermined selecting signals, and the driven LED chips in the first luminous module emit light according to a first luminous signal of the set of luminous signals corresponding to the first predetermined selecting signal.

Wherein, each of the plurality of LED chips in the first luminous modules includes a LED power pin and a LED ground pin. The LED power pins of the LED chips are electrically connected to the corresponding LED pins of the driving chip respectively, and the LED ground pins of the LED chips are electrically connected to the ground pin of the driving chip of the first luminous module.

Furthermore, the luminous device includes a rechargeable battery electrically connected to the controlling device for providing power to the controlling device.

Furthermore, the luminous device includes a switch electrically connected to the controlling device. When the switch is turned off, the controlling device does not send the power signal.

Wherein, the plurality of LED chips of the first luminous module include a first driven LED chip, a second driven LED chip and a third driven LED chip, and the wave lengths of the light respectively emitted by the first driven LED chip, the second driven LED chip and the third driven LED chip are different.

Furthermore, another category of the present invention is to provide a wearable object with lighting function to solve the problems of the prior art.

In one embodiment of the present invention, the wearable object with lighting function includes a main body and a luminous device. The luminous device is coupled to the main body and includes a controlling device, a strip circuit board and a plurality of luminous modules. The controlling device is configured in a containing part of the main body, and the controlling device is configured to send a power signal. The power signal includes a set of predetermined selecting signals and a set of luminous signals corresponding to the set of predetermined selecting signals. The strip circuit board is electrically connected to the controlling device and coupled to the main body. The plurality of luminous modules are configured on the strip circuit board. Each of the luminous modules respectively includes a plurality of LED chips, a driving chip and a package body. The driving chip is configured to selectively drive the LED chips to emit light. The driving chip includes a power pin, a plurality of LED pins corresponding to the LED chips, and a ground pin. The package body is configured to seal the driving chip and the LED chips. Wherein, the strip circuit board includes two wires and a plurality of component disposing areas. The two wires are coupled to the plurality of component disposing areas, and the luminous modules are positioned in the plurality of component disposing areas respectively and are configured to receive the power signal through the two wires. Each of the driving chips receives the power signal by the power pin. The driving chip of a first luminous module of the plurality of luminous modules selectively drives the plurality of LED chips in the first luminous module based on a first predetermined selecting signal of the set of predetermined selecting signals, and the driven LED chips emit light according to a first luminous signal of the set of luminous signals corresponding to the first predetermined selecting signal.

Wherein, the two wires include a power wire and a ground wire, and the power wire is configured to transmit the power signal to the plurality of luminous modules.

Furthermore, the wearable object includes a motion sensor electrically connected to the controlling device. The motion sensor is configured to generate a first controlling signal while an external force is applied on the motion sensor, and the controlling device loads the set of predetermined selecting signals and the set of luminous signals corresponding to the set of predetermined selecting signals into the power signal according to the first controlling signal. Moreover, the wearable object includes a switch electrically connected to the controlling device. When the switch is turned off, the controlling device does not send the power signal. Furthermore, the wearable object includes a battery electrically connected to the controlling device for providing power to the controlling device. The battery, the controlling device and the motion sensor are contained and sealed in the package body having a one-piece form.

Wherein, the strip circuit board includes a first strip circuit board and a second strip circuit board. The first strip circuit board and the second strip circuit board are connected in series by two power conductive wires electrically connecting to the two wires respectively.

Compared with the prior art, the luminous device of the present invention uses the power signal of selecting the LED chips as the driving power for driving the LED chips to emit light at the same time. Therefore, the luminous signal and the driving power can be transmitted on the same set of circuit, which not only reduces the volume of the luminous device but also saves cost.

DETAILED DESCRIPTION OF THE INVENTION

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention, wherein the specific methods, devices, conditions, materials and the like are not limited to the embodiments of the present invention or corresponding embodiments. Moreover, the devices in the figures are only used to express their corresponding positions and are not drawing according to their actual proportion.

Figure 1:
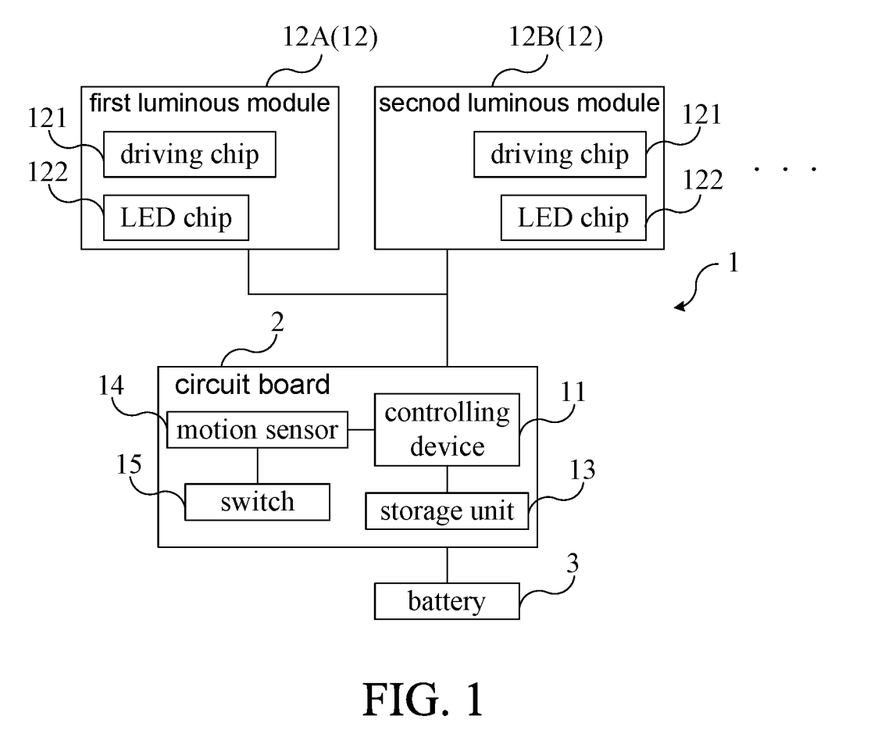
FIG. 1 is a function block diagram illustrating a luminous device according to one embodiment of the present invention.

Please refer to FIG. 1. FIG. 1 is a function block diagram illustrating a luminous device 1 according to one embodiment of the present invention. As shown in FIG. 1, the luminous device 1 includes a controlling device 11 and a plurality of luminous modules 12. The controlling device 11 is electrically connected to the luminous modules 12 and configured to send a power signal to the luminous modules 12, wherein the power signal includes a selecting signal and a luminous signal. The luminous module 12 (such as 12A and 12B) includes a driving chip 121 and a LED chip 122 connected to the driving chip 121. In practice, the controlling device 11 is electrically connected to the plurality of luminous modules 12 in series or parallel. The controlling device 11 can include a controlling chip integrated with the circuit board 2, and the controlling device 11 can be configured on the circuit board 2 to send the power signal. The luminous module 12 can include the circuit board, and the driving chip 121 and the LED chip 122 are configured on the circuit board. The driving chip 121 can be a driving IC, and each driving chip 121 of the luminous modules 12 has an identifying code different from others. In practice, the luminous element of the luminous module 12 is not limited to one LED chip 122. The luminous module 12 can also include a plurality of LED chips (the LED chips can respectively emit lights with different colors, such as red, green and blue LED chips).

As mentioned above, the power signal includes the selecting signal and the luminous signal, and the luminous signal further includes a color code information. In practice, the selecting signal can be a signal matching the identifying code of the driving chip 121 of the luminous module 12, and the color code information can be a signal determining the light emitting or color scale of the LED chip 122 of the luminous module 12. The selecting signal of the power signal can be located before the luminous signal. That is to say, when the controlling device 11 sends a set of power signal, the controlling device 11 sends the selecting signal first, and then sends the luminous signal including the color code information. The selecting signal and the luminous signal can be formed of at least one binary bit signal (I/O), and the lengths of bit signals of the selecting signal and the color code information can be different. For example, as shown in FIG. 1, the number of the luminous modules 12 is 2, and the number of the LED chip 122 of each luminous module 12 is 1. When the binary code of the selecting signal corresponding to the driving chip 121 of the first luminous module 12A is "0" and the binary code of the selecting signal corresponding to the driving chip 121 of the second luminous module 12B is "1", the controlling device 11 can send the selecting signal with binary code "0" or "1" to control the LED chip of the first luminous module 12A or the second luminous module 12B to emit light. Since each driving chip 121 of the luminous modules 12 has the identifying code different from others, the number of the selecting signals sent by the controlling device 11 can be 2 or more to recognize and control the luminous modules 12 when the number of the luminous modules 12 is greater than 2.

The selecting signal and the luminous signal of the power signal can be formed of data frame. The data frame comprises three parts: header, LED color scale and ending code, wherein the header is aforementioned selecting signal, and the LED color scale is aforementioned color code information. In this embodiment, the header and the LED color scale are formed of 8 bits, and the ending code is formed of 1 bit. Therefore, the data length of the data frame is 8 bits+8 bits+1 bit. When the controlling device 11 sends the power signal to the plurality of luminous modules 12 and the identifying code of any driving chip 121 of the luminous modules 12 matches the header of the power signal, the driving chip 121 matching the header determines the illuminating brightness of the LED chip 122 according to the LED color scale of the power signal and drives the LED chip 122 to emit light. For example, the identifying code of the driving chip 121 of the first luminous module 12A is "00100000". When the power signal sent by the controlling device 11 includes the header with "00100000" and the color scale with "00000101", the driving chip 121 having the identifying code "00100000" drives the LED chip 122 to emit light with the brightness of the LED color scale "00000101". The illuminating brightness of the LED chip 122 will be described later. It is worth noting that the number of the luminous modules 12 in FIG. 1 is, but not limited to, 2. The number of the luminous module 12 can be 1 or more than 2, and the number of LED chips 122 of each of luminous modules 12 can over than 1, such as red, green and blue LEDs.

Figure 2:
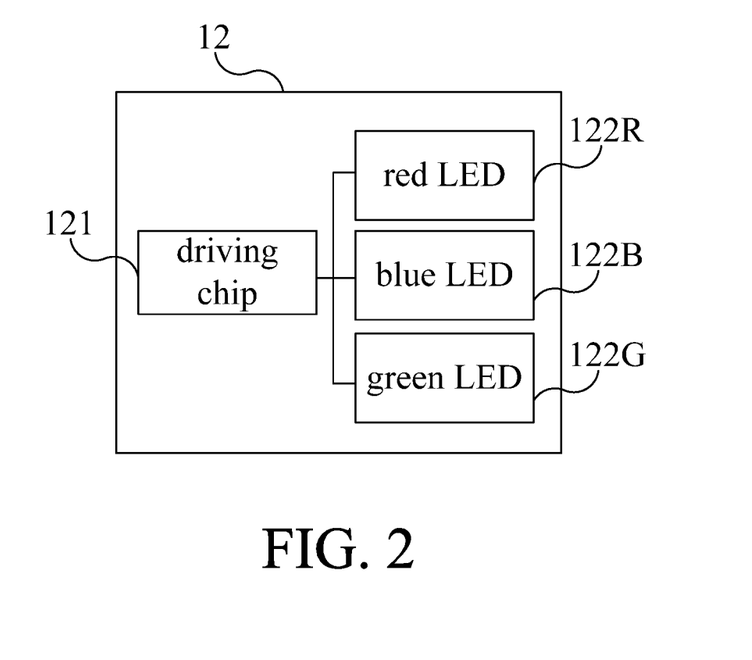
FIG. 2 is a function block diagram illustrating a luminous module according to one embodiment of the present invention.
Figure 3:
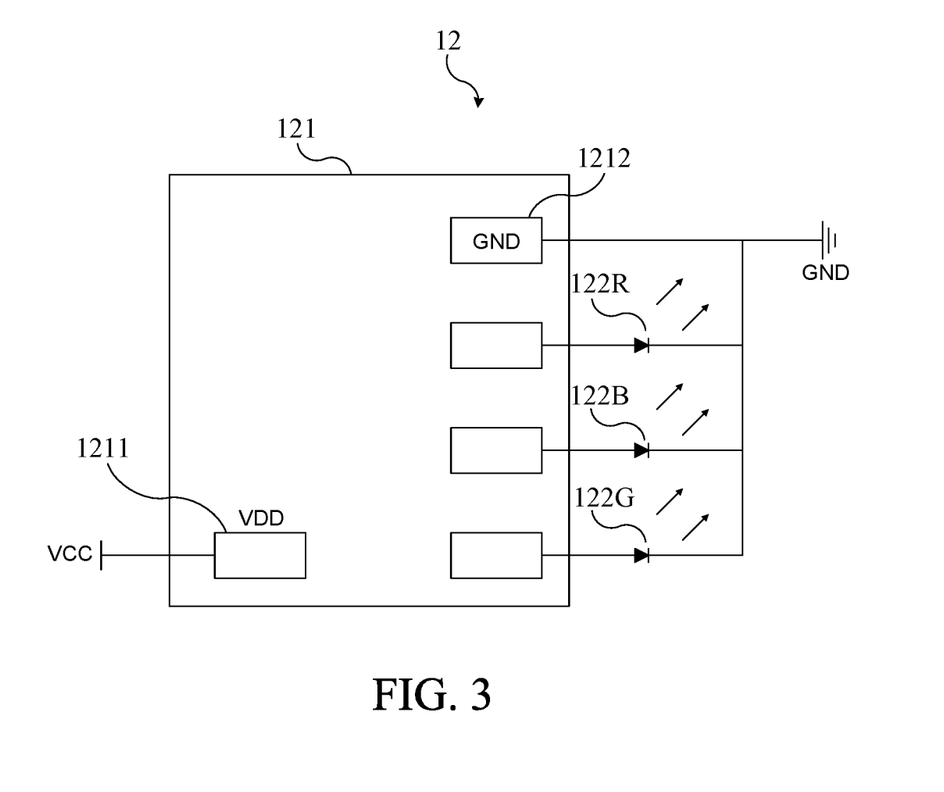
FIG. 3 is a structural schematic diagram illustrating the luminous module of FIG. 2.
Figure 6A:
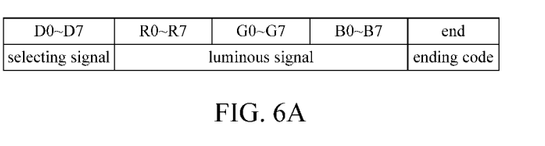
FIG. 6A is a data structural schematic diagram illustrating the data frame according to one embodiment of the present invention.

Please refer to FIG. 2, FIG. 3 and FIG. 6A. FIG. 2 is a function block diagram illustrating a luminous module 12 according to one embodiment of the present invention. FIG. 3 is a structural schematic diagram illustrating the luminous module 12 of FIG. 2. FIG. 6A is a data structural schematic diagram illustrating the data frame according to one embodiment of the present invention. The number of the LED color scales of the data frame can be corresponding to that of the LED chips. In practice, the number of the LED chip 122 of the luminous module 12 can be 1 or more than 1. Each of the LED chips 122 emits light with the wave length different from others. That is to say, each of the LED chips 122 emits light with the color different from others. As shown in FIG. 2 and FIG. 6, when the number of LED chips 122 is 3 and the LED chips are red LED chip 122R (the wave length is between 620~750 nm), green LED chip 122G (the wave length is between 495~570 nm) and blue LED chip 122B (the wave length is between 450~495 nm), the power signal sent by the controlling device 11 includes the LED color scale with three colors and the three colors of the LED color scale are sent to the same luminous module 122. At this time, the data length of the data frame is 8 bits+8 bits*3+1 bit. In FIG. 6, "D0~D7" means the bit numbers of the selecting signal, "R0~R7" means the bit numbers of the red LED chip 122R, "G0~G7" means the bit numbers of the green LED chip 122G, "B0~B7" means the bit numbers of the blue LED chip 122B, and "end" means the bit number of the ending code. When the identifying code of the driving chip 121 matches the header of the power signal, the driving chip 121 respectively drives the red LED chip 122R, the green LED chip 122G and the blue LED chip 122B to emit light according to the LED color scales of three colors.

In this embodiment, the LED color scale is sent to the luminous module 12 with 8 bit binary signal to enable the corresponding LED chip to generate the luminous intensity with 256 scales, but it is not limited thereto. In another embodiment, the LED color scale can be the color code information generated by the color code with other system (such as octal and hexadecimal), and the luminous module 12 further includes a color code transducer (not shown in the figure). The color code transducer of the luminous module 12 transforms the LED color scales into the corresponding binary color scale values corresponding to the red LED chip 122R, the green LED chip 122G and the blue LED chip 122B respectively when the LED color scales are sent to the luminous module 12, and the driving chip 121 drives the red LED chip 122R, the green LED chip 122G and the blue LED chip 122B to emit light according to each of the color scale values. In another embodiment, the data structure of the data frame is not limited to be arranged in the order of the selecting signal, the color code information, and the ending code. The order of the data structure of the data frame can be changed. Therefore, the driving chip 121 with the identifying code matching the selecting signal drives the LED chip 122 to emit light according to the color code information when the luminous module 12 receives the data frame.

Figure 6B:
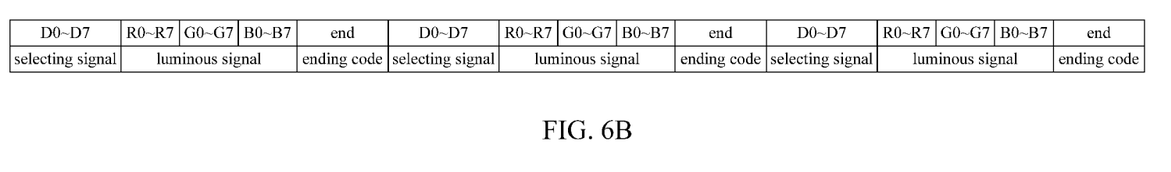
FIG. 6B is a data structural schematic diagram illustrating the plurality of data frames according to one embodiment of the present invention.

Please refer to FIG. 1 and FIG. 6B. FIG. 6B is a data structural schematic diagram illustrating the plurality of data frames according to one embodiment of the present invention. In addition to the combination of a single selecting signal and a single luminous signal or the combination of a single selecting signal and a plurality of luminous signals, the power signal also can include a set of predetermined selecting signals and a set of luminous signals. As shown in FIG. 6B, the set of predetermined selecting signals includes a plurality of selecting signals, and each selecting signal is corresponding to at least one luminous signal of the set of luminous signals. When the controlling device 11 sends the power signal having the set of predetermined selecting signals and the set of luminous signals to the luminous modules 12, the driving chip 121 matching the selecting signal of the set of predetermined selecting signals drives the luminous modules 12 to emit light according to the luminous signal corresponding to the selecting signal. In practice, the set of predetermined selecting signals can include a first selecting signal, a second selecting signal and a third selecting signal, and the set of luminous signals can include a first luminous signal, a second luminous signal and a third luminous signal. The arranged sequence of the selecting signals and the luminous signals in the power signal sent by the controlling device 11 can be the first selecting signal, the first luminous signal, the second selecting signal, the second luminous signal, the third selecting signal and the third luminous signal. Therefore, the first driving chip of the first luminous module 12A matching the first selecting signal drives the first luminous module 12A to emit light according to the first luminous signal after the first selecting signal when the controlling device 11 sends the power signal to the luminous modules 12. Moreover, the controlling device 11 also can send the set of predetermined selecting signals of the power signal first, and then send the set of luminous signal, wherein the arranged sequence of all luminous signals is corresponding to that of all selecting signals. For example, in the power signal sent by the controlling device 11, the first selecting signal is located on the first position of the set of predetermined selecting signals, and the first luminous signal corresponding to the first selecting signal is located on the first position of the set of luminous signals. Therefore, when the identifying code of the first driving chip of the first luminous module 12A matches the first selecting signal located on the first position of the set of predetermined selecting signals, the first driving chip drives the first luminous module 12A to emit light according to the first luminous signal corresponding to the first selecting signal.

In one embodiment, when the controlling device 11 sends the power signal including a set of predetermined selecting signals and a set of luminous signals to the luminous modules 12 and each of the selecting signals and the luminous signals are arranged in sequence, the driving chip 121 matching the selecting signal sequentially drives the luminous modules 12 to emit light according to the color code information of the luminous signals. For example, when the controlling device 11 sends the power signals in the order of a first luminous module 12A, a second luminous module 12B and a third luminous module (not shown in figure), the driving chips of the first luminous module 12A, the second luminous module 12B and the third luminous module sequentially drive a first LED chip 122A, a second LED chip 122B and a third LED chip 122C to emit light according to the selecting signal matching the identifying code of the driving chip 121 and the luminous signal of the power signal, so as to generate a sequentially lighting mode. The sequentially lighting mode of this embodiment can be the lighting mode for the luminous modules 12 or for the LED chips 122 in the luminous module 12. Moreover, the lighting color in the sequentially lighting mode of the luminous module 12 can keep the same, or change with the sequence. In practice, the lighting mode is not limited to the sequentially lighting mode and simultaneously lighting mode. The lighting mode also can be a combination of flashing, eternal lighting, fade out, simultaneous lighting and sequential lighting.

Figure 4:
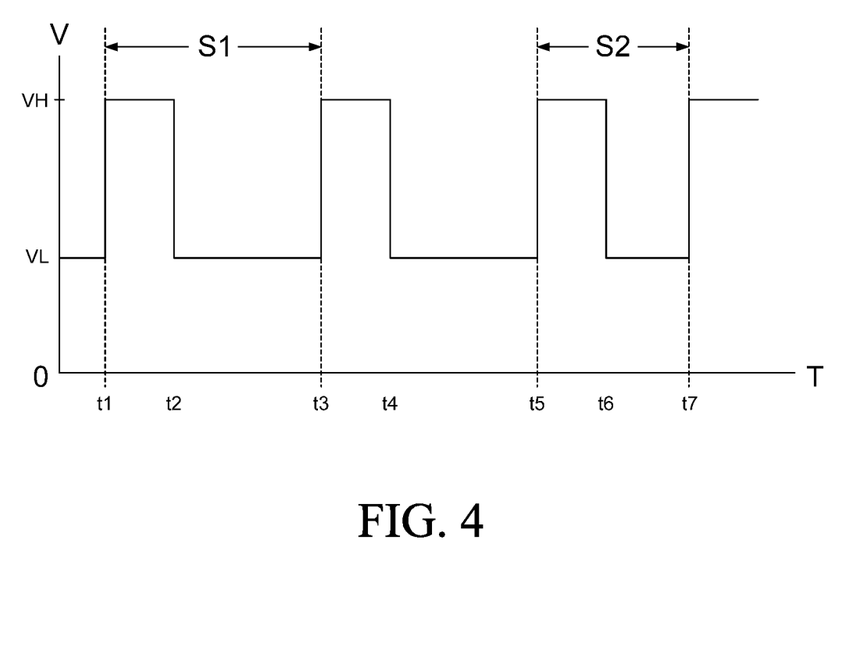
FIG. 4 is a schematic diagram illustrating the waveforms of the luminous signal according to one embodiment of the present invention.
Figure 7:
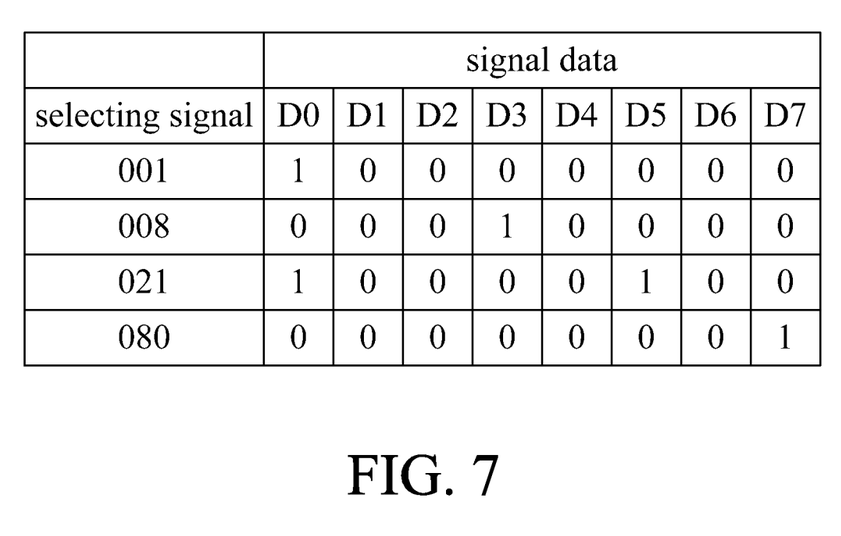
FIG. 7 is a signal data schematic diagram illustrating the positional code information according to the embodiments of the present invention.

Please refer to FIG. 1, FIG. 4 and FIG. 7. FIG. 4 is a schematic diagram illustrating the waveforms of the luminous signal according to one embodiment of the present invention. FIG. 7 is a signal data schematic diagram illustrating the positional code information according to the embodiments of the present invention. The luminous device 1 of the present invention can further include a battery 3. The battery 3 is electrically connected to the circuit board 2 to provide power to the controlling device 11. When the controlling device 11 sends the power signal to the luminous module 12, the controlling device 11 can load the selecting signal and the luminous signal into the power signal through the power provided by the battery 3 and send the power signal to the luminous module 12 to make the LED chip 122 emit light. In practice, the battery 3 can be a primary cell such as heavy duty, alkaline battery and so on, and can be a secondary battery such as rechargeable battery. Furthermore, the battery 3 can be a rechargeable battery with a USB port. In one embodiment, the battery 3 provides a DC voltage, and the controlling device 11 loads the selecting signal and the luminous signal into the DC voltage (such as 1.8V, 2V or 2.2V) to form the power signal. At this time, the power signal comprises bit signals with different voltage values. As shown in FIG. 4, the horizontal axis means time (T), and the vertical axis means the voltage (V). In this embodiment, a bit signal can be formed of a waveform, and the waveform includes a peak zone (t1~t2 in the waveform) and a base zone (t2~t3 in the waveform). Wherein, the peak zone voltage value (VH) is greater than the base zone voltage value (VL). Moreover, the base zone voltage value is greater than the grounding voltage value. In practice, the peak zone voltage value of the waveform can be between 3V and 6V, and the base zone voltage value of the waveform can be between 1.8V and 2.5V, but it is not limited thereto. Therefore, the power signal is formed of a plurality of waveforms with different voltage values. Furthermore, the power signal includes the header formed of a plurality of waveforms, the LED color scale formed of the plurality of waveforms, and the ending code formed of at least one waveform.

In general, the binary codes of the digital signals can be distinguished from each other by the wave peaks and wave troughs of the waveform. The wave peak is determined as "1" of the binary code when the waveform of the digital signal is at the wave peak with the voltage value, and the wave trough is determined as "0" of the binary code when the waveform of the digital signal is at the wave trough of the grounding terminal. However, in another embodiment, the binary code "1" or "0" of the bit signal is not determined by the wave peak or wave trough of the waveform to determine, but by the time length of the waveform of the bit signal in the base zone. As shown in FIG. 4, the first bit signal S1 includes the peak zone t1~t2 and the base zone t2~t3, and the second bit signal S2 includes the peak zone t5~t6 and the base zone t6~t7. Wherein, the time length of the peak zone t1~t2 of the first bit signal S1 is the same as that of the peak zone t5~t6 of the second bit signal S2, and the time length of the base zone t2~t3 of the first bit signal S1 is different from that of the base zone t6~t7 of the second bit signal S2. In one embodiment, the bit signal is determined as "1" of the binary code when the time length of the base zone in the bit signal is greater than a predetermined time length. On the contrary, the bit signal is determined as "0" of the binary code when the time length of the base zone in the bit signal is smaller than the predetermined time length. For example, when the predetermined time length is 8 µs, the time length of the base zone t2~t3 of the first bit signal S1 is 12 µs, and the time length of the base zone t6~t7 of the second bit signal S1 is 6 µs, the first bit signal S1 is determined as "1" of the binary code and the second bit signal S2 is determined as "0" of the binary code. In one embodiment, the binary code of the bit signal is determined by the ratio of time length of the base zone and the peak zone. For example, if the time length of the peak zone is 4 µs and the time length of the base zone is between 2 and 4 times of that of the peak zone (such as the time length of the base zone is between 9.5 µs and 15.5 µs), the bit signal is determined as "1" of the binary code. If the time length of the base zone is between 1 and 2 times of that of the peak zone (such as the time length of the base zone is between 4.5

μs and 7.5 μs), the bit signal is determined as "0" of the binary code. However, in practice, the multiple of time length of the base zone and the peak zone in the binary signal is not limited thereto.

As shown in FIG. 7, the bit signal of the power signal is formed as eight signal data consisting of "1" and "0" after being transformed as the binary code. In practice, when the serial number of the selecting signal is 008, the converted binary code of the selecting signal is presented in the order of "00010000". In one embodiment, the selecting signal can be a decimal value and each bit of the signal data can be a value respectively (such as D0 to D7 respectively mean the values of 1, 2, 4, 8, 10, 20, 40 and 80), and the signal data is transformed as the binary value according to the data code information. For example, when the value of the selecting signal is 021, the converted binary signal data is "10000100", and the driving chip 121 of the luminous module 12 compares the converted signal data of the selecting signal with the identifying code. The driving chip 121 drives the LED chip to emit light according to the converted signal data of the color code information when the comparison result is the converted signal data matching the identifying code. It is worth noting that FIG. 7 only shows the converted signal data of the selecting signal, and the converted signal data structure of the color code information can be the same as that of the selecting signal.

In practice, when the controlling device 11 sends the power signal including the plurality of waveforms, the driving chip 121 of the luminous module 12 transforms the waveforms into the binary codes according to the time length of the base zone of each waveform in power signal. The driving chip 121 with the identifying code matching the converted binary selecting signal further drives the LED chip 122 to emit light according to the binary color code information and the power of the power signal.

As shown in FIG. 4, both voltage values of the base zones in the first bit signal S1 and the second bit signal S2 are greater than the voltage value of the grounding terminal (the voltage value is 0). In this embodiment, the driving chip of the luminous module transforms the waveforms of the power signal into the binary codes and drives the LED chip to emit light by the power of the waveforms when the controlling device sends the power signal to the luminous module. Since the LED chip emits light by the current and current value can be calculated by the color code information, the driving chip determines the illuminating brightness of the LED chip according to the current value calculated by the color code information. For example, the maximum current required for the LED chip is 6 mA, and when the brightness ratio of the color code information is 50% of the maximum brightness of the LED chip, the driving chip drives the LED chip to emit light by a current of 3 mA.

Please refer to FIG. 2 and FIG. 3 again. As shown in FIG. 3, the luminous module 12 can include a driving chip 121 and a plurality of LED chips. In one embodiment, the driving chip 121 can include a power pin 1211, a ground pin 1212 and a plurality of LED pins. The power pin 1211 is configured to receive the power signal. The ground pin 1212 is configured for grounding. Each of the LED pins can be connected to the LED chips respectively. Each of the LED chips includes a LED power pin and a LED ground pin. Each of the LED power pins is correspondingly connected to each of the LED pins of the driving chip 121, and the LED ground pins are connected to the ground pin 1212 of the driving chip 121. The driving chip 121 and the LED chips can be contained in a package body. In practice, the power pin 1211 of the driving chip 121 receives the power signal when the controlling device sends the power signal to the luminous module 12, and the driving chip 121 selectively drives the LED chips to emit light according to the color code information of the power signal. Since the LED ground pin of the LED chip is connected to ground, the voltage difference can be selectively formed between the LED power pin of each of LED chips and LED ground pin according to the color code information when the driving chip 121 sends the power signal to the LED chips. The potential difference leads the current to pass through the LED chips to make the LED chip to emit light, and the package body can be an IC case to contain and seal the driving chip 121 and the LED chips.

In one embodiment, the luminous module 12 can include a storage unit. When the controlling device sends the power signal to the luminous module 12, the luminous module 12 stores the power to the storage unit, and then, the driving chip 121 drives the red LED 122R, the blue LED 122B and the green LED 122G according to the color code information. In practice, the storage unit can be a capacitance.

Figure 5:
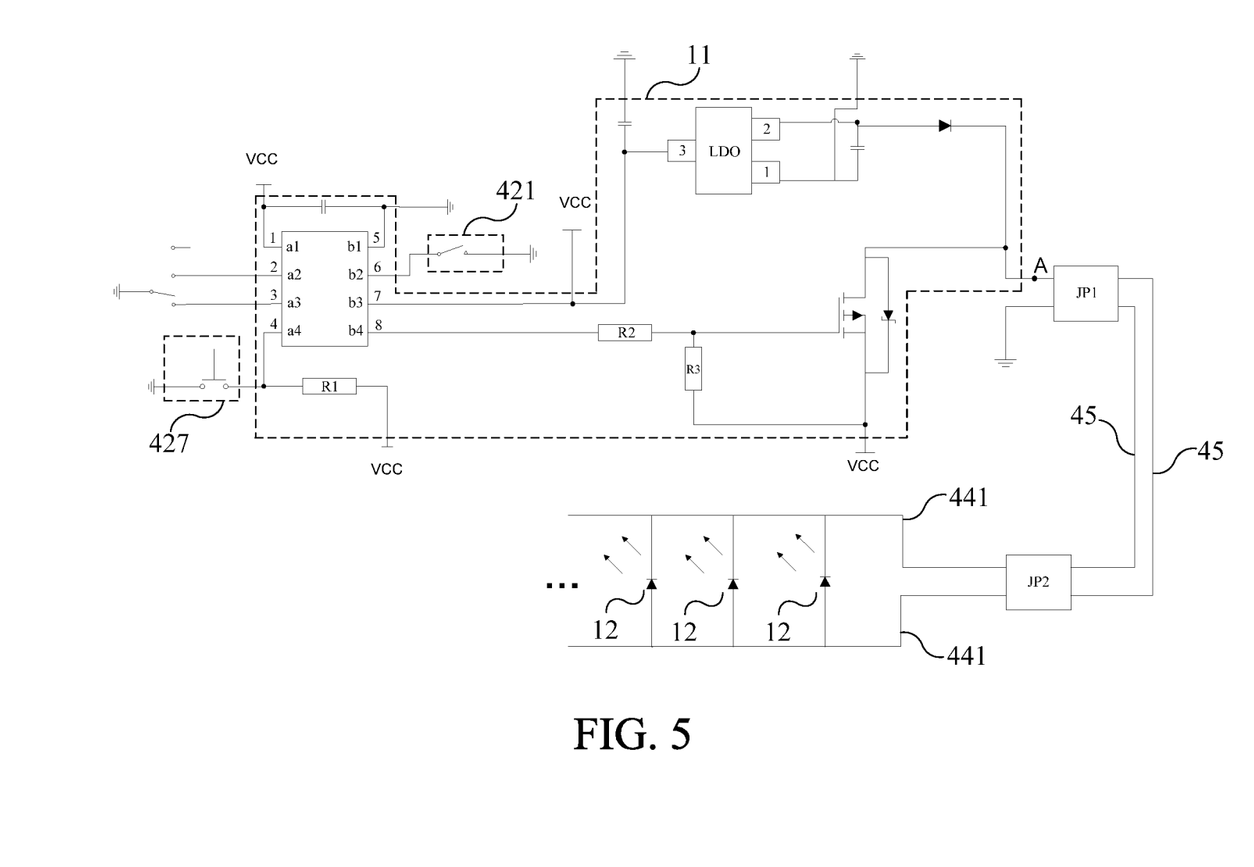
FIG. 5 is a circuit diagram illustrating the luminous device according to one embodiment of the present invention.

Please refer to FIG. 1, FIG. 4 and FIG. 5. FIG. 5 is a circuit diagram illustrating the luminous device 1 according to one embodiment of the present invention. It is worth noting that the luminous module 12 of FIG. 5 is simply illustrated with only one LED symbol. Moreover, in FIG. 5, LDO is a linear regulator, R1 to R3 are resistances, and JP1 and JP2 are connectors. These aforementioned components in FIG. 5 are the components of the prior art, and their functions would not be described herein. As shown in FIG. 5, a signal point A is located between the controlling device 11 and the first connector JP1, and the controlling device 11 sends the power signal to the first connector JP1 through the signal point A. Then, the power signal is sent from the first connector JP1 to the second connector JP2, and the plurality of luminous modules 12 connected to the second connector JP2 emit light according to the power signal. When the controlling device 11 generates the power signal, the controlling device 11 can generate the base value and the peak value of the bit signal by the circuit paths connected to the pin b3 and pin b4 respectively, and the power signal can be formed of the combination of outputs of the pin b3 and pin b4. Therefore, the power signal can be formed on the signal point A according to the combination of the order and number of the signals generated by the pin b3 and pin b4 of the controlling device 11.

The controlling device can be connected to the plurality of luminous modules 12 in parallel. In one embodiment, all of the driving chips 121 of the luminous modules 12 receive the selecting signal and the luminous signal of the power signal when the controlling device 11 sends the power signal to the luminous modules 12. In practice, when the identifying code of one of the driving chips 121 matches the selecting signal of the power signal, this driving chip 121 transforms the color code information of the luminous signal into the binary code and drives the LED chip 122 to emit light. When the identifying code of the driving chip 121 does not match the selecting signal of the power signal, this driving chip 121 does not drive the LED chip 122 to emit light. In another embodiment, the driving chips 121 of the luminous modules 12 only receive the selecting signal of the power signal when the controlling device 11 sends the power signal to the luminous modules 12. In practice, when the identifying code of one of the driving chips 121 matches the selecting signal of the power signal, the driving chip 121 receives the luminous signal of the power signal and drives the LED chip 122 to emit light according to the color code information of the luminous signal.

Since the luminous module 12 emits light with different lighting modes through the controlling device 11 continuously sending the data frames, the power signal sent by the controlling device 11 is a plurality of data frames. In addition to the selecting signal and the luminous signal, the data frame sent by the controlling device 11 also includes the ending code. In practice, the ending code can be a bit signal, wherein the time length of the peak value of the ending code is the same as that of the other bit signals but the time length of the base value of the ending code is greater than that of the peak value. Therefore, the driving chip 121 of the luminous module 12 can discriminate each of the data frames according to the time length of the base value of the ending code when the controlling device 11 sends the power signal including the data frames. In another embodiment, the time length of the peak value of the ending code is smaller than that of the other bit signals (such as ⅓ of the time length). Therefore, the driving chip 121 can discriminate each of data frames according to the ending code having shorter time of the peak value.

In another embodiment, the luminous module 12 can further include a counter (not shown in the figure), and the counter is electrically connected to the driving chip 121. The counter is configured to count the number of the bit signal. In practice, the controlling device 11 sends the power signal including 8 bits selecting signals and 8 bits color code information. The counter classifies the first 8 bit signals into a first signal block and classifies the last 8 bit signals into the second signal block after receiving the power signal. The counter returns to zero after classifying the second signal block. Therefore, the driving chip 121 can recognize the selecting signal and the luminous signal according to the first signal block and the second signal block classified by the counter, and can discriminate each of data frames according to the counter returning to zero.

Please refer to FIG. 1 again. The luminous device 1 of the present invention can further include a motion sensor 14 electrically connected to the controlling device 11. The motion sensor 14 is configured to detect if there is an external force applied on the luminous device 1 and generate a controlling signal, and the controlling device 11 sends the power signal according to the controlling signal. In practice, the motion sensor 14 can be a vibration sensor and can be configured on the circuit board 2. When the vibration sensor detects the external force applied on the luminous device 1, the vibration sensor generates the controlling signal and sends it to the controlling device 11. The controlling device 11 can send the luminous signal to the luminous module 12 according to the controlling signal to drive the luminous module 12 to emit light.

In one embodiment, the controlling device 11 is connected to the motion sensor 14 and a storage unit 13, and the storage unit 13 stores the power signals with different lighting modes. In practice, the motion sensor 14 sends a controlling signal to the controlling device 11 when the motion sensor 14 detects the external force applied on the luminous device 1 for the first time. The controlling device 11 sends the power signal with the first lighting mode to the luminous module 12 according to the controlling signal to drive the luminous module 12 to emit light with the first lighting mode. Then, the motion sensor 14 generates a controlling signal again when the motion sensor 14 detects the external force applied on the luminous device 1 again, and the controlling device 11 sends the power signal with the second lighting mode to the luminous module 12 according to the controlling signal to drive the luminous module 12 to emit light with the second lighting mode.

In other one embodiment, the controlling device 11 sequentially sends the lighting modes of the power signal stored in the storage unit 13 according to the controlling signal generated by the motion sensor 14. In practice, the motion sensor 14 sends a controlling signal to the controlling device 11 when the motion sensor 14 detects the external force applied on the luminous device 1. The controlling device 11 sends the first lighting mode of the power signal stored in the storage unit 13 to the luminous module 12 according to the controlling signal to drive the luminous module 12 to emit light with the first lighting mode, and then, the controlling device 11 sends the second lighting mode of the power signal stored in the storage unit 13 to the luminous module 12 to drive the luminous module 12 to emit light with the second lighting mode.

Furthermore, the luminous device 1 of the present invention further includes a switch 15 connected to the controlling device 11. In practice, the switch 15 can be a power switch including ON/OFF (such as rotational switch, toggle switch, button switch and so on). The switch 15 can be configured on the circuit board 2, or configured away from the circuit board 2 but electrically connected to the circuit board 2. The switch 15 can be used as a basis for determining whether the control device 11 sends a power signal. In one embodiment, the switch 15 is electrically connected to the controlling device 11 and the battery 3 that provides the power of the controlling device 11. When the switch 15 is turned on, the switch 15 allows the controlling device 11 to send the power signal having the power provided by the battery 3 to the luminous module 12 to make the luminous module 12 to emit light. When the switch 15 is turned off, the switch 15 blocks the battery 3 from providing the power to the controlling device 11 to make the controlling device 11 not to send the power signal. In another embodiment, the switch 15 is connected to the motion sensor 14 and the controlling device 11. When the switch is turned on, the switch 15 allows the controlling device 11 to send the power signal according to the controlling signal sent by the motion sensor 14 to the luminous module 12 to make the luminous module 12 to emit light. When the switch 15 is turned off, the switch 15 blocks the motion sensor 14 from sending the controlling signal to the controlling device 11 to make the controlling device 11 not to send the power signal.

Figure 8:
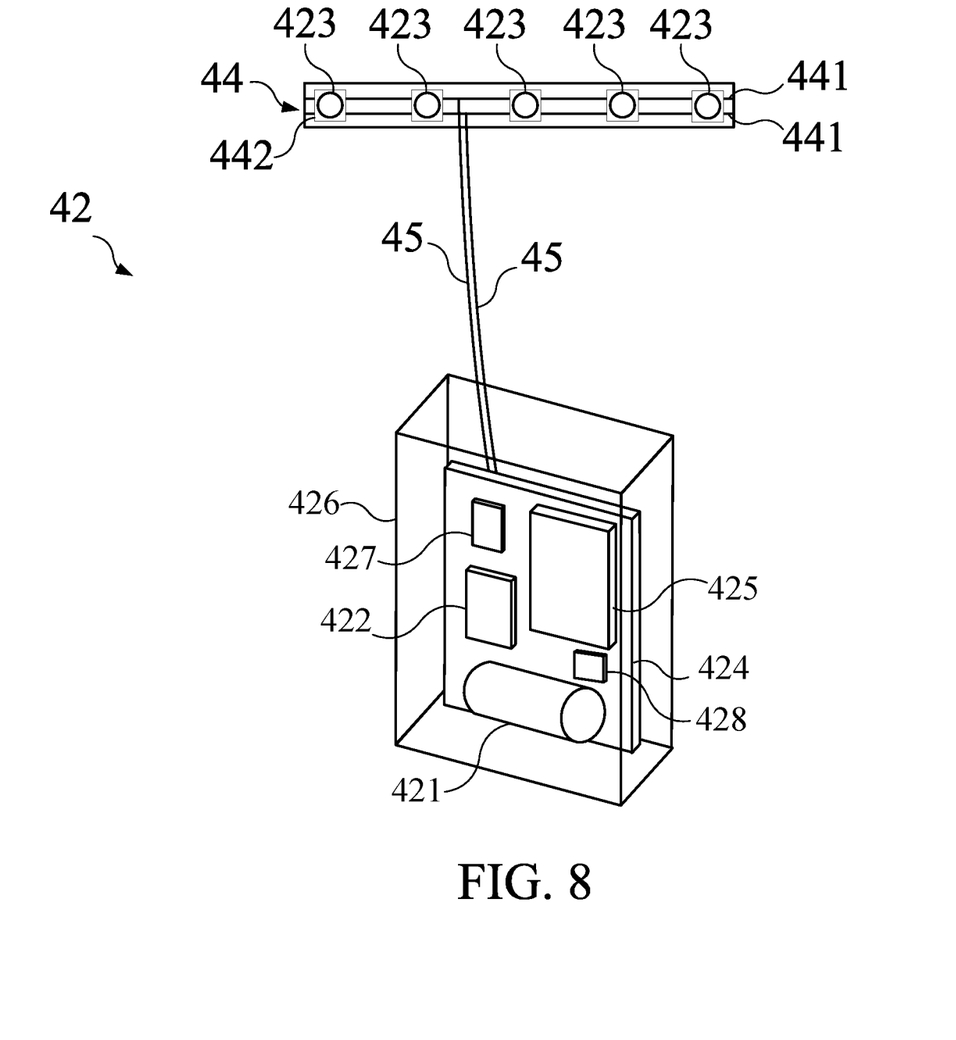
FIG. 8 is a structural schematic diagram illustrating the luminous device according to one embodiment of the present invention.
Figure 9:
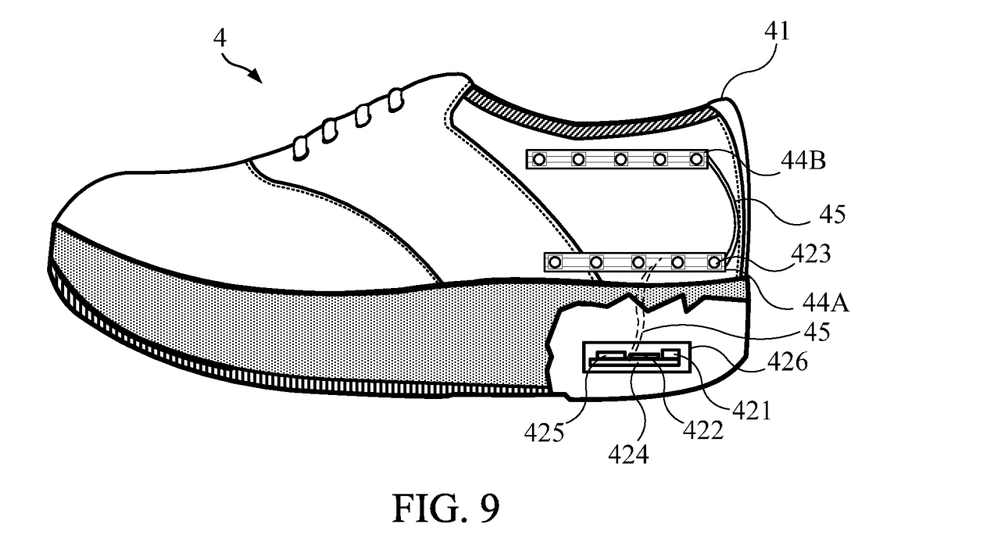
FIG. 9 is a simple schematic diagram illustrating a wearable object according to one embodiment of the present invention.

Please refer to FIG. 8 and FIG. 9. FIG. 8 is a structural schematic diagram illustrating the luminous device 42 according to one embodiment of the present invention. FIG. 9 is a simple schematic diagram illustrating a wearable object 4 according to one embodiment of the present invention. As shown in FIG. 8 and FIG. 9, the luminous device of the present invention also can be applied on the wearable object 4. In this embodiment, the wearable object 4 includes a main body 41 (such as shoes) and a luminous device 42. The luminous device 42 is configured in the main body 41 (such as the heel of the shoe), and includes a controlling device 422, a strip circuit board 44 and a plurality of luminous modules 423. The controlling device 422 is configured in a containing part of the main body 41 and sends the power signal. The strip circuit board 44 is electrically connected to the controlling device 422 and configured on the main body 41 (such as the vamp of the shoe). The luminous modules 423 are configured on the strip circuit board 44. It is worth noting that the functions of the controlling device 422 and the luminous modules 423 of this embodiment are the same as those of the corresponding element of above embodiments, and they would not be described again herein.

In practice, the main body 41 can be a shoe and include a containing part located in the sole. The luminous device 42 can include a storage unit 428, and the storage unit 428 stores at least one lighting mode. Moreover, the luminous device 42 can include a battery 425 configured on the circuit board 424, and include a waterproof case 426 configured in the containing part. The waterproof case 426 is configured to contain and seal the circuit board 424, the storage unit 428, the controlling device 422 and the battery 424 to prevent the luminous device 42 from moisture, oxidation or sully. All components of the luminous device 42 in this embodiment can be corresponding to those of the above embodiment of FIG. 1.

The wearable object 4 in this embodiment can further include a motion sensor 421 and a switch 427 connected to the controlling device 422. The functions of the motion sensor 421 and the switch 427 of this embodiment are the same as those of the motion sensor 14 and the switch 15 of the embodiment in FIG. 1, and they are not described again herein.

Furthermore, the luminous modules 423 can be configured on the strip circuit board 44 in series or parallel with each other, and the strip circuit board 44 can be configured on the outer surface of the main body 41. In this embodiment, the strip circuit board 44 includes two wires 441 and a plurality of component disposing areas 442, and the strip circuit board 44 is connected to the circuit board 424 through the power conductive wire 45. In practice, the material of the wire 441 can be copper, and the strip circuit board 44 includes two copper wires. Each of the luminous modules 423 is configured in the component disposing areas 442. The copper wires on the strip circuit board 44 are electrically connected to the circuit board 424 by the two power conductive wires 45 respectively. The two wires 441 respectively are a power wire and a ground wire, and they are connected to the power wire and the ground wire of the power conductive wires 45 respectively. Therefore, the power wire of the two wires 441 can transmit the power signal sent by the controlling device 422 to the luminous modules 423. Moreover, the luminous device 42 can include a first connector (not shown in the figure), and the two wires 441 of the strip circuit board 44 can be connected to a second connector (not shown in the figure). The first connector and the second connector can be connected to each other by the two power conductive wires 45. As shown in FIG. 5, JP1 and JP2 are connected by the two power conductive wires 45. In FIG. 8, the strip circuit board 44 is connected to the circuit board 424 by the two power conductive wire 45. Compared FIG. 8 to FIG. 5, it would be known that the JP1 is the first connector and the JP2 is the second connector. The wires 441 of FIG. 5 is the copper wires, and both ends of each of luminous modules 423 are connected to the copper wires respectively. Therefore, when the motion sensor 421 generates the controlling signal, the controlling device 422 sends the power signal through the power conductive wires 45 to the strip circuit board 44 according to the controlling signal, and further sends the power signal to each luminous module 423 through the copper wires.

Please refer to FIG. 9 again. As shown in FIG. 9, the first strip circuit board 44A and the second strip circuit board 44B are connected in series by the power conductive wires 45. In practice, the power conductive wires 45 between the first strip circuit board 44A and the second strip circuit board 44B can be power wires, and the power conductive wires 45 respectively connects to the copper wires of the first strip circuit board 44A and the second strip circuit board 44B to cascade the first strip circuit board 44A and the second strip circuit board 44B. Therefore, in addition to the power conductive wires 45 between the first connector and the second connector, the controlling device 422 can also transmit the power signal through the power conductive wires 45 between the first strip circuit board 44A and the second strip circuit board 44B.

In conclusion, the luminous device of the present invention sends the power signal having signal and power by the controlling device in the same circuit to control the LED chips to emit light. The luminous device not only reduces the volume, but also saves the cost.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:
1. A luminous device, comprising:
 a luminous module, comprising:
  a plurality of LED chips;
  a driving chip configured to selectively drive the LED chips to emit light, the driving chip comprising a power pin, a plurality of LED pins corresponding to the LED chips, and a ground pin; and
  a package body configured to seal the driving chip and the LED chips;
 wherein, the driving chip receives a power signal by the power pin, the power signal comprises a selecting signal, and a luminous signal, the driving chip selectively drives the LED chips based on the selecting signal and the driven LED chips emit light according to the luminous signal;
 wherein, the luminous signal comprises a color code information for determining the illuminating brightness of the driven LED chips, the color code information comprises a plurality of bit signals and each of the bit signals comprises a waveform, the waveform comprises a peak zone and a base zone and the value of each bit signal is defined according to a time length of the base zone, the peak zone has a peak zone voltage value between 3.0V and 6.0V and the base zone has a base zone voltage value between 1.8V and 2.5V.

2. The luminous device of claim 1, wherein each of the LED chips comprises a LED power pin and a LED ground pin, the LED power pins of the LED chips are electrically connected to the corresponding LED pins of the driving chip respectively, and the LED ground pins of the LED chips are electrically connected to the ground pin of the driving chip.

3. The luminous device of claim 1, wherein a data frame with the plurality of bit signals comprises the selecting signal and the color code information.

4. The luminous device of claim 1, further comprising:
 a motion sensor configured to detect whether an external force is applied on the luminous device and to selectively generate a first controlling signal; and
 a controlling device configured to send the power signal, the controlling device being electrically connected to the motion sensor and loading a set of predetermined selecting signals and a set of luminous signals corresponding to the set of predetermined selecting signals into the power signal according to the first controlling signal.

5. The luminous device of claim 4, further comprising a rechargeable battery electrically connected to the controlling device for providing power to the controlling device.

6. The luminous device of claim 4, further comprising a switch electrically connected to the controlling device, wherein when the switch is turned off, the controlling device does not send the power signal.

7. A wearable object with lighting function, comprising:
a main body; and
a luminous device coupled to the main body, the luminous device comprising:
   a plurality of LED chips;
   a driving chip configured to selectively drive the LED chips to emit light, the driving chip comprising a power pin, a plurality of LED pins corresponding to the LED chips, and a ground pin; and
   a package body configured to seal the driving chip and the LED chips;
wherein, the driving chip receives a power signal by the power pin, the power signal comprises a selecting signal, and a luminous signal, the driving chip selectively drives the LED chips based on the selecting signal and the driven LED chips emit light according to the luminous signal;
wherein, the luminous signal comprises a color code information for determining the illuminating brightness of the driven LED chips, the color code information comprises a plurality of bit signals and each of the bit signals comprises a waveform, the waveform comprises a peak zone and a base zone and the value of each bit signal is defined according to a time length of the base zone, the peak zone has a peak zone voltage value between 3.0V and 6.0V and the base zone has a base zone voltage value between 1.8V and 2.5V.

8. The wearable object of claim 7, wherein each of the LED chips comprises a LED power pin and a LED ground pin, the LED power pins of the LED chips are electrically connected to the corresponding LED pins of the driving chip respectively, and the LED ground pins of the LED chips are electrically connected to the ground pin of the driving chip.

9. The wearable object of claim 7, wherein the luminous device further comprises:
a controlling device positioned in a containing part of the main body, the controlling device being configured to send the power signal, and the power signal comprising a set of predetermined selecting signals and a set of luminous signals corresponding to the set of predetermined selecting signals.

10. The wearable object of claim 9, further comprising:
a motion sensor electrically connected to the controlling device, the motion sensor being configured to generate a first controlling signal while an external force is applied on the motion sensor, and the controlling device loading the set of predetermined selecting signals and the set of luminous signals corresponding to the set of predetermined selecting signals into the power signal according to the first controlling signal.

* * * * *